US012606091B2

(12) United States Patent
Kudo

(10) Patent No.: US 12,606,091 B2
(45) Date of Patent: Apr. 21, 2026

(54) REAR VIEW IMAGE DISPLAY SYSTEM

(71) Applicant: ALPS ALPINE CO., LTD., Tokyo (JP)

(72) Inventor: Nobunori Kudo, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 18/652,227

(22) Filed: May 1, 2024

(65) Prior Publication Data

US 2024/0391388 A1 Nov. 28, 2024

(30) Foreign Application Priority Data

May 22, 2023 (JP) ................................. 2023-084078

(51) Int. Cl.
*B60R 1/26* (2022.01)
*B60R 1/25* (2022.01)

(52) U.S. Cl.
CPC .................. *B60R 1/26* (2022.01); *B60R 1/25* (2022.01); *G06T 2207/30252* (2013.01)

(58) Field of Classification Search
CPC ....... B60R 1/26; B60R 1/25; B60R 2300/105; B60R 2300/303; B60R 2300/406; B60R 2300/802; G06T 2207/30252
See application file for complete search history.

(56) References Cited

U.S. PATENT DOCUMENTS

| | | | |
|---|---|---|---|
| 2013/0236858 A1 | 9/2013 | Lin et al. | |
| 2016/0152263 A1* | 6/2016 | Singh | .................... B60T 8/1708 |
| | | | 701/41 |
| 2017/0280091 A1* | 9/2017 | Greenwood | ............ G06T 11/00 |
| 2017/0341583 A1 | 11/2017 | Zhang et al. | |

(Continued)

FOREIGN PATENT DOCUMENTS

| | | | | |
|---|---|---|---|---|
| GB | 2541906 A | * | 3/2017 | ............... B60R 1/00 |
| JP | 2019-199150 | | 11/2019 | |

(Continued)

OTHER PUBLICATIONS

Extended European Search Report for 24176189.9 mailed on Sep. 27, 2024.

*Primary Examiner* — Farzana Hossain

(74) *Attorney, Agent, or Firm* — IPUSA, PLLC

(57) ABSTRACT

Rear view image display system to display tractor's rear view image with less blind corners naturally is provided. Of parts of region of rear view image captured by tractor rear camera situated on tractor rear portion, the region being shielded by trailer, parts, view within which in directions from tractor rear camera to themselves is image-captured by trailer's side cameras without being shielded by trailer are replaced with images transformed from images captured by side cameras to tractor rear camera's viewing point. Of the remaining parts, a part, view within which in direction from tractor rear camera to itself is image-captured by trailer's rear camera without being shielded by trailer is replaced with image transformed from image captured by trailer's rear camera to tractor rear camera's viewing point, to generate rear view image to be displayed. Each part is calculated based on trailer's detected hitch angle.

8 Claims, 11 Drawing Sheets

(56) References Cited

U.S. PATENT DOCUMENTS

| | | | |
|---|---|---|---|
| 2018/0141496 A1 | 5/2018 | Loehr et al. | |
| 2019/0162545 A1* | 5/2019 | Greenwood | G01C 21/3407 |
| 2019/0184900 A1* | 6/2019 | Lang | B60R 1/25 |
| 2020/0001922 A1 | 1/2020 | Yamamoto et al. | |
| 2021/0094473 A1 | 4/2021 | Gali et al. | |
| 2022/0266749 A1* | 8/2022 | Kuruba | B60R 1/26 |
| 2022/0314884 A1* | 10/2022 | Uppara | B60R 1/105 |
| 2022/0371514 A1 | 11/2022 | Castro | |
| 2023/0308598 A1* | 9/2023 | Higashiyama | G06T 3/4038 |

FOREIGN PATENT DOCUMENTS

| | | |
|---|---|---|
| JP | 2020-001631 | 1/2020 |
| JP | 2021-170826 | 10/2021 |
| JP | 2021-177145 | 11/2021 |
| JP | 2022-547068 | 11/2022 |
| WO | 2017/037266 | 3/2017 |

* cited by examiner

REAR VIEW IMAGE DISPLAY SYSTEM

CROSS-REFERENCE TO RELATED APPLICATION

The present application claims priority under 35 U.S.C. § 119 to Japanese Patent Application No. 2023-084078, filed May 22, 2023, the contents of which are incorporated herein by reference in their entirety.

BACKGROUND OF THE INVENTION

Field of the Invention

The present disclosure relates to a technique of displaying a rear view image to a user of a tractor configured to pull a trailer.

Description of the Related Art

A technique known as a technique for displaying a rear view image to a user of a tractor configured to pull a trailer displays an image captured by a camera situated on a rear portion of a trailer and an image of a rear view captured by a camera situated on a tractor, by synthesizing the images as if they represented one scene (for example, Japanese Patent Application Laid-Open Publication No. 2021-170826).

A technique also known as a technique for displaying a rear view image to a user of a tractor configured to pull a trailer generates a panorama view image representing a wide view around a trailer by synthesizing images captured by three cameras situated on left and right side portions and a rear portion of the trailer, cuts out a partial fixed-size range from the panorama view image, and displays the cut-out range while overlaying it on a region in which the trailer appears in an image of a rear view captured by a camera situated on a rear portion of a tractor (for example, Japanese Translation of PCT International Publication No. 2022-547068). Here, the technique changes the range to be displayed by being cut out from the panorama view image, in accordance with a hitch angle, which is a relative angle of the front-rear direction of the trailer with respect to the front-rear direction of the tractor.

Techniques known as techniques for detecting a hitch angle of a trailer include a technique of detecting a hitch angle by recognizing the center axis of a drawbar of a trailer from an image captured by a camera (for example, Japanese Patent Application Laid-Open Publication No. 2020-1631), a technique of calculating a hitch angle based on the distances from a tractor to both the left and right ends of a trailer in the front-rear direction of the tractor measured using a laser range finder (for example, Japanese Patent Application Laid-Open Publication No. 2021-177145), and a technique of detecting a hitch angle of a trailer based on the inclination of a pattern of a marker pasted on the upper surface of a drawbar of the trailer, an image of the marker being captured by a camera (for example, Japanese Patent Application Laid-Open Publication No. 2019-199150).

SUMMARY OF THE INVENTION

According to the technique of displaying an image captured by the camera situated on the rear portion of the trailer and an image of a rear view captured by the camera situated on the tractor by synthesizing the images, when the hitch angle of the trailer is large, there occurs behind the tractor, a region shielded against the camera situated on the tractor by a side surface of the trailer. As a result, there occurs a range, an image of which cannot be captured by any of the cameras and which hence cannot be displayed and is a blind corner to the user of the tractor.

According to the above-described technique of displaying a part of a panorama view image that is cut out in accordance with the hitch angle of the trailer, a range that is shielded against the camera situated on the tractor by a side surface of the trailer and corresponds to a part that is not to be cut out from the panorama view image occurs depending on the hitch angle, as a range behind the tractor, which is a blind corner to the user of the tractor.

Moreover, the image displayed by this technique is discontinuous and unnatural, because of, for example, an image captured by the camera situated on the tractor and an image cut out from the panorama view image being varied in the viewing point and the viewing direction, the size of a side surface of the trailer that appears in an image of a rear view captured by the camera situated on the rear portion of the tractor and hence the size of the trailer-appearing region in the displayed image being subject to changes in accordance with the hitch angle of the trailer whereas the size of a part of the panorama view image that is displayed while being overlaid on the trailer-appearing region being fixed, and the like.

Hence, an object of the present disclosure is to display an image representing a rear view of a tractor with a smaller blind corner range in a more natural manner.

To achieve the object described above, the present disclosure provides a rear view image display system configured to display a rear view image that is an image representing a rear view of a tractor configured to pull a trailer, with: a tractor rear camera that is a camera configured to capture an image of a rear view from a rear portion of the tractor; a trailer rear camera that is a camera configured to capture an image of a rear view from a rear portion of the trailer; a trailer right camera that is a camera configured to capture an image of a surrounding view of the trailer from a right side portion of the trailer; a trailer left camera that is a camera configured to capture an image of a surrounding view of the trailer from a left side portion of the trailer; a hitch angle sensor configured to detect a hitch angle of the trailer; and a processor configured to generate the rear view image in accordance with a program readably stored in a memory. The processor calculates, based on the hitch angle detected by the hitch angle sensor, a shielded direction range that is a direction range seen from the tractor rear camera, the rear view in the shielded direction range being shielded against the tractor rear camera by the trailer, a right replacement direction range in the shielded direction range, the right replacement direction range being a direction range seen from the tractor rear camera and fully unshielded against the trailer right camera by the trailer, a left replacement direction range in the shielded direction range, the left replacement direction range being a direction range seen from the tractor rear camera and fully unshielded against the trailer left camera by the trailer, and a rear replacement direction range other than the right replacement direction range and the left replacement direction range in the shielded direction range, the rear replacement direction range being a direction range unshielded against the trailer rear camera by the trailer, and the processor generates the rear view image by replacing a part of a tractor rear view image that is an image captured by the tractor rear camera, the part corresponding to the right replacement direction range, with an image appearing in a part, corresponding to the right replacement direction range, of an image obtained by transforming an image captured by the trailer right camera to an image seen from a same viewing point as that of the tractor rear view image, replacing a part of the tractor rear view image corresponding to the left replacement direction range with an image appearing in a part, corresponding to the left replacement direction range, of an image obtained by transforming an image captured by the trailer left camera to an image seen from the same viewing point as that of the tractor rear view image, and replacing a part of the tractor rear view image corresponding to the rear replacement direction range with an image appearing in a part, corresponding to the rear replacement direction range, of an image obtained by transforming an image captured by the trailer rear camera to an image seen from the same viewing point as that of the tractor rear view image.

Here, in the rear view image display system, the processor may generate the rear view image by replacing a part of the tractor rear view image corresponding to a direction range that is other than the right replacement direction range, the left replacement direction range, and the rear replacement direction range in the shielded direction range with a predetermined pattern.

To achieve the object described above, the present disclosure provides a rear view image display system configured to display a rear view image that is an image representing a rear view of a tractor configured to pull a trailer, with: a tractor rear camera that is a camera configured to capture an image of a rear view from a rear portion of the tractor; a trailer rear camera that is a camera configured to capture an image of a rear view from a rear portion of the trailer; a trailer right camera that is a camera configured to capture an image of a surrounding view of the trailer from a right side portion of the trailer; a trailer left camera that is a camera configured to capture an image of a surrounding view of the trailer from a left side portion of the trailer; a hitch angle sensor configured to detect a hitch angle of the trailer; and a processor configured to generate the rear view image in accordance with a program readably stored in a memory. The processor calculates, based on the hitch angle detected by the hitch angle sensor, a right replacement direction range that is a direction range seen from the tractor rear camera as being included in a right side surface of the trailer, a left replacement direction range that is a direction range seen from the tractor rear camera as being included in a left side surface of the trailer, and a rear replacement direction range that is a direction range seen from the tractor rear camera as being included in a rear surface of the trailer, and the processor generates the rear view image by replacing a part of a tractor rear view image that is an image captured by the tractor rear camera, the part corresponding to the right replacement direction range, with an image appearing in a part, corresponding to the right replacement direction range, of an image obtained by transforming an image captured by the trailer right camera to an image seen from a same viewing point as that of the tractor rear view image, replacing a part of the tractor rear view image corresponding to the left replacement direction range with an image appearing in a part, corresponding to the left replacement direction range, of an image obtained by transforming an image captured by the trailer left camera to an image seen from the same viewing point as that of the tractor rear view image, and replacing a part of the tractor rear view image corresponding to the rear replacement direction range with an image appearing in a part, corresponding to the rear replacement direction range, of an image obtained by transforming an image captured by the trailer rear camera to an image seen from the same viewing point as that of the tractor rear view image.

Here, in the rear view image display system, the processor may calculate a masking direction range that is a direction range seen from the tractor rear camera as being included in a bottom surface of the trailer, based on the hitch angle detected by the hitch angle sensor, and the processor may generate the rear view image by replacing a part of the tractor rear view image corresponding to the masking direction range with a predetermined pattern.

As described above, the rear view image display system generates a rear view image representing the rear view of the tractor by replacing parts of an image captured by the camera situated on the rear portion of the tractor, the parts being shielded by the trailer, with images obtained by viewing-point-wise transforming images, which are captured for the same direction ranges as those of the shielded parts by the three cameras situated on the rear portion of the trailer, the right side portion of the trailer, and the left side portion of the trailer, to images seen from the viewing point of the camera situated on the rear portion of the tractor.

Here, the three cameras situated on the rear portion of the trailer, the right side portion of the trailer, and the left side portion of the trailer can capture images of views that are behind, on the right-hand side of, and on the left-hand side of the trailer without omission.

The parts of the image captured by the camera situated on the rear portion of the tractor, the parts being shielded by the trailer, are replaced with images seen from the same viewing point as that of the image.

Hence, the rear view image display system can generate and display, as the rear view image, an image that represents, without any blind corner, seamlessly, and without any unnaturalness, a view in a wide range behind the tractor, which could generally be seen from the viewing point of the camera situated on the rear portion of the tractor if the trailer were transparent.

As described above, the present disclosure can display an image representing a rear view of a tractor with a smaller blind corner range in a more natural manner.

DESCRIPTION OF THE EMBODIMENTS

An embodiment of the present disclosure will be described below.

Figure 1:
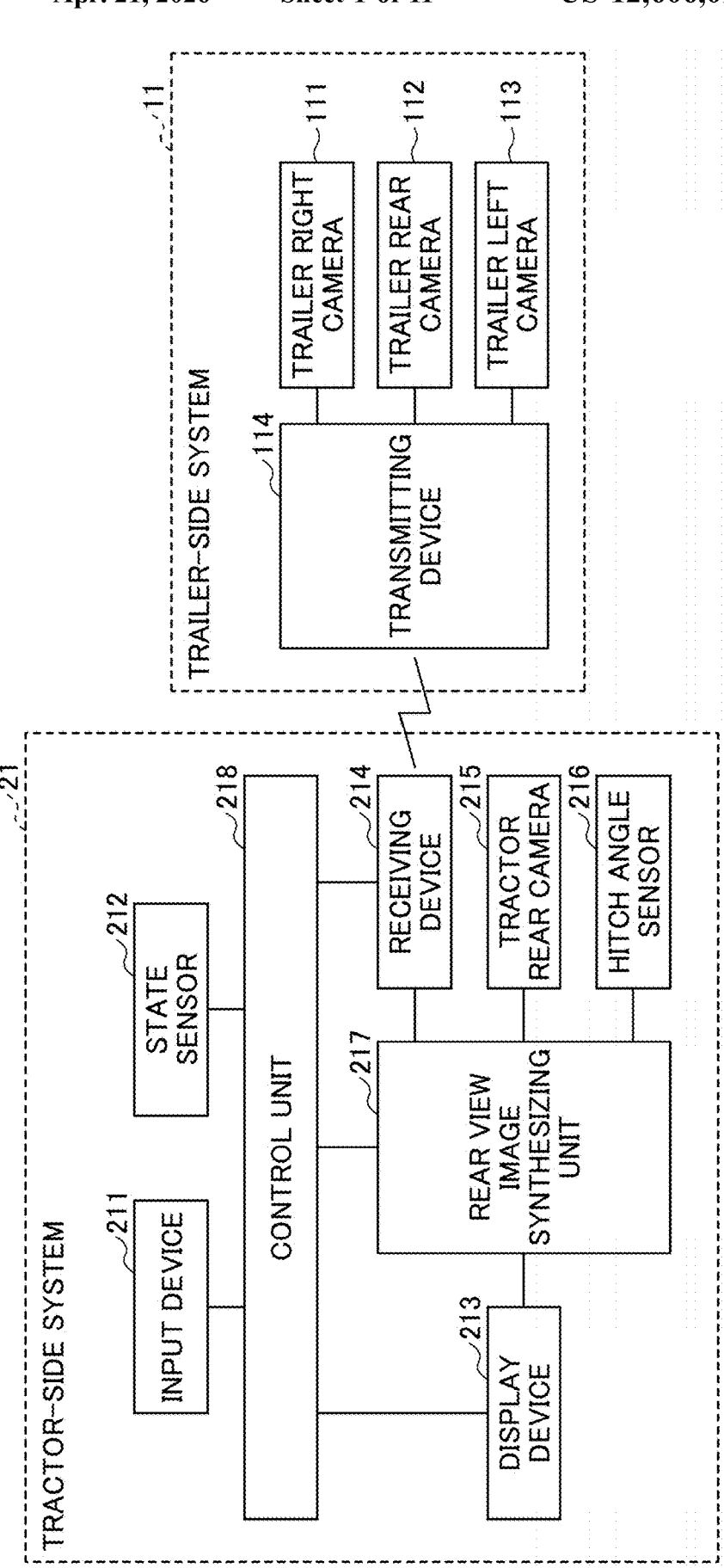
FIG. 1 is a block diagram illustrating the configuration of a drive assisting system according to an embodiment of the present disclosure.

FIG. 1 illustrates the configuration of a drive assisting system according to the present embodiment.

Figures 2A, 2B:
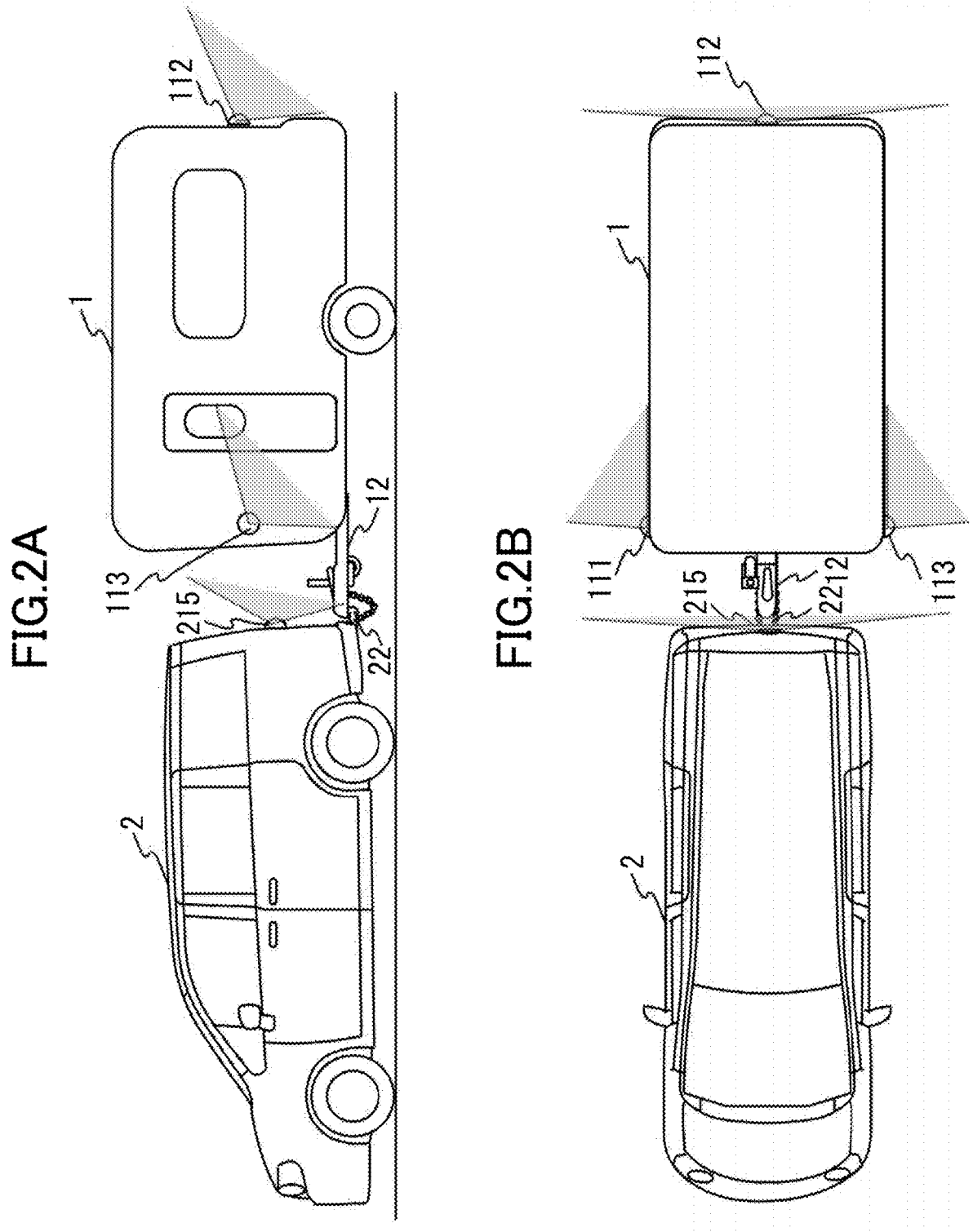
FIG. 2A is a view illustrating a tractor and a trailer according to an embodiment of the present disclosure.
FIG. 2B is a view illustrating a tractor and a trailer according to an embodiment of the present disclosure.

The drive assisting system is configured to assist in driving of a tractor 2 configured to pull a trailer 1 such as a camping trailer and the like illustrated in FIG. 2A and FIG. 2B.

Referring back to FIG. 1, the drive assisting system includes a trailer-side system 11 mounted on the trailer 1, and a tractor-side system 21 mounted on the tractor 2.

The trailer-side system 11 includes three cameras including a trailer right camera 111, a trailer rear camera 112, and a trailer left camera 113, and a transmitting device 114 configured to wirelessly transmit images captured by the cameras to the tractor-side system 21.

The tractor-side system 21 includes an input device 211, a state sensor 212 configured to detect various states of the tractor 2 such as the forward/reverse travelling state of the tractor 2, the steered angle of the tractor 2, and the like, a display device 213, a receiving device 214 configured to receive images wirelessly transmitted from the transmitting device 114 of the trailer-side system 11, a tractor rear camera 215, a hitch angle sensor 216 configured to detect a hitch angle of the trailer 1, a rear view image synthesizing unit 217 configured to generate a rear view image by synthesizing images captured by the trailer right camera 111, the trailer rear camera 112, and the trailer left camera 113, received by the receiving device 214, and an image captured by the tractor rear camera 215, and to display the rear view image on the display device 213, and a control unit 218 configured to control each of the units described above. The control unit 218 is realized by a processor such as Central Processing Unit (CPU) or the like operating in accordance with a program readably stored in a memory, to control each of the units.

The images captured by the trailer right camera 111, the trailer rear camera 112, and the trailer left camera 113 may be transmitted from the trailer-side system 11 to the tractor-side system 21 by wired transmission. In this case, the transmitting device 114 and the receiving device 214 are omitted, and the images captured by the trailer right camera 111, the trailer rear camera 112, and the trailer left camera 113 are directly transmitted to the rear view image synthesizing unit 217.

As illustrated in FIG. 2A and FIG. 2B, the trailer right camera 111 of the trailer-side system 11 captures an image of the rear view from a position near the front end of the right side of the trailer 1, the trailer rear camera 112 captures an image of the rear view from the left-right direction center position of the rear portion of the trailer 1, and the trailer left camera 113 captures an image of the rear view from a position near the front end of the left side of the trailer 1.

The tractor rear camera 215 of the tractor-side system 21 captures an image of the rear view from the left-right direction center position of the rear portion of the tractor 2.

A drawbar 12 coupling with the chassis extends from a lower portion of the front end of the trailer 1 to ahead of the trailer 1. By a coupler situated on the front end of the drawbar 12 being swingably engaged with a hitch ball situated on the rear end of a hitch member 22 extending to behind the tractor 2 from a lower portion of the rear end of the tractor 2, the trailer 1 is coupled to the tractor 2.

Figures 3A, 3B:
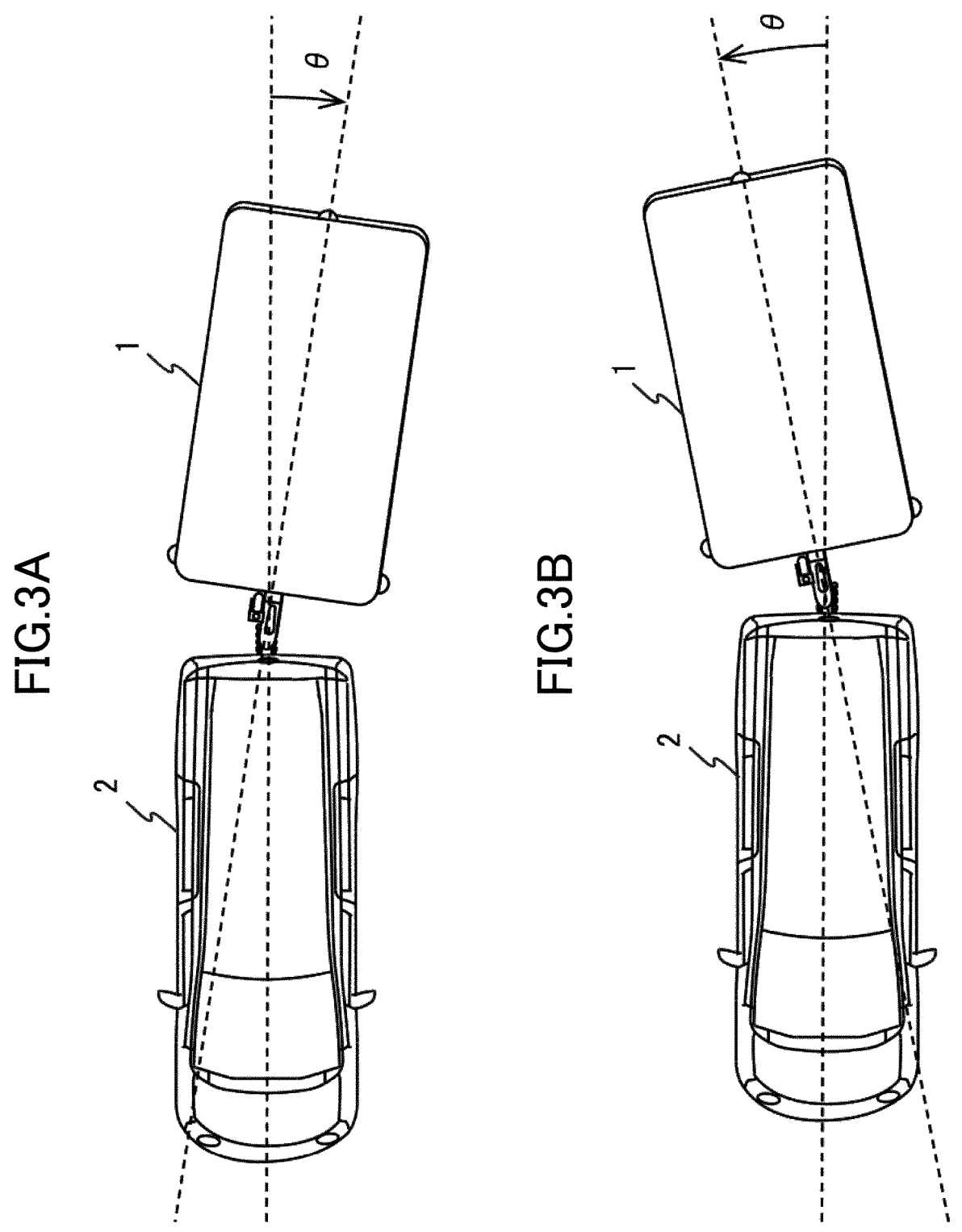
FIG. 3A is a view illustrating a hitch angle to be detected according to an embodiment of the present disclosure.
FIG. 3B is a view illustrating a hitch angle to be detected according to an embodiment of the present disclosure.

Hence, as illustrated in FIG. 3A and FIG. 3B, the trailer 1 can swing with respect to the tractor 2 about the upper-lower direction center axis of the coupler and the hitch ball. The angle θ of the swinging is the hitch angle of the trailer 1 to be detected by the hitch angle sensor 216. Generation of a rear view image performed by the rear view image synthesizing unit 217 will be described below.

Here, generation and display of the rear view image may be performed constantly, or may be performed only in a period of time in which the state sensor 212 is detecting that the tractor 2 is reversing, or may be performed in response to a user's operation.

In the following description, an image output by the trailer right camera 111 is referred to as a trailer right view image, an image output by the trailer left camera 113 is referred to as a trailer left view image, an image output by the trailer rear camera 112 is referred to as a trailer rear view image, and an image output by the tractor rear camera 215 is referred to as a tractor rear view image. These cameras are configured to output images flipped left to right (mirror images).

First, a positional relationship between each of the trailer right camera 111, the trailer left camera 113, and the trailer rear camera 112, and the tractor rear camera 215 is calculated based on the hitch angle θ of the trailer 1 detected by the hitch angle sensor 216, and, in accordance with the calculated positional relationship, a viewing point transform function for viewing-point-wise transforming a trailer right view image to an image captured from the position of the tractor rear camera 215, a viewing point transform function for viewing-point-wise transforming a trailer left view image to an image captured from the position of the tractor rear camera 215, and a viewing point transform function for viewing-point-wise transforming a trailer rear view image to an image captured from the position of the tractor rear camera 215 are set.

Here, per hitch angle, a viewing point transform function for each image may be previously calculated and registered in association with the hitch angle, and the viewing point transform function registered in association with a hitch angle θ detected by the hitch angle sensor 216 may be used as the viewing point transform function to be set in generating a rear view image.

Based on the hitch angle θ of the trailer 1 detected by the hitch angle sensor 216, the rear view image synthesizing unit 217 sets extraction regions, which are regions defining image parts to be extracted from the trailer right view image, the trailer left view image, and the trailer rear view image, to be synthesized with a tractor rear view image.

Figure 4:
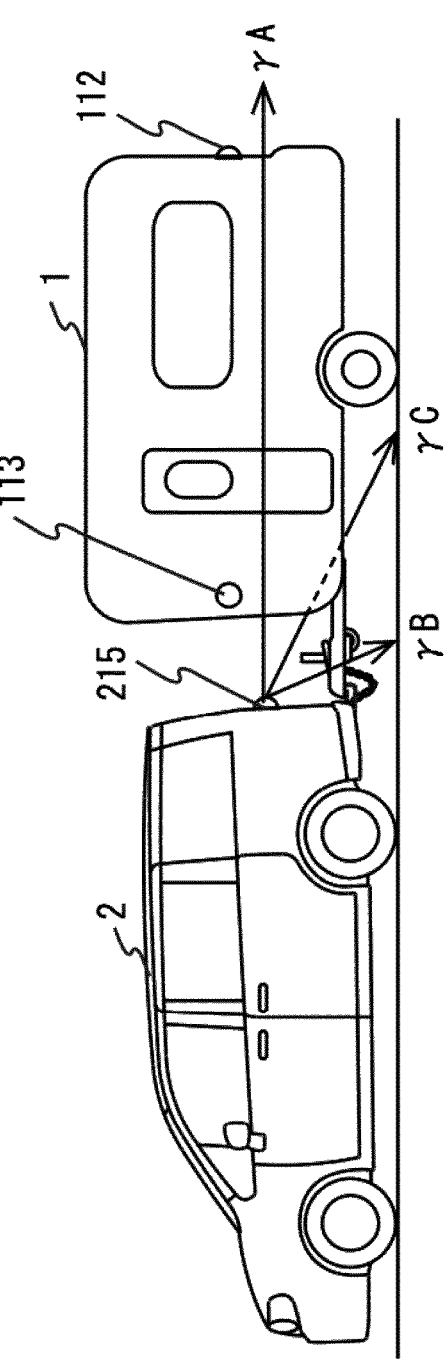
FIG. 4 is a view illustrating ranges in which images are used according to an embodiment of the present disclosure.

The extraction regions are set as follows. That is, regarding a left-right direction angular range that is at an angle of elevation or depression (i.e., an upper-lower direction angle) γA when seen from the tractor rear camera 215 illustrated in FIG. 4, an angular range Sφm illustrated in FIG. 5A and FIG. 5B, which is within a horizontal-direction image-capturing angular field of view φmR+Sφm+φmL of the tractor rear camera 215, is calculated. The angular range Sφm is a range that is defined in accordance with the hitch angle θ and is shielded against the tractor rear camera 215 by the trailer 1.

Then, a region of the trailer right view image that corresponds to an angular range φR within the angular range Sφm is determined in accordance with the hitch angle θ. The angular range φR is a range, a rear view behind the tractor 2 within which range in the direction defined by the angle of elevation or depression γA appears as an image fully without being shielded by the trailer 1, in a version of the trailer right view image that is viewing-point-wise transformed to an image captured from the position of the tractor rear camera 215 in a case of viewing-point-wise transforming the trailer right view image using the set viewing point transform function.

Regarding the other angles of elevation or depression within the angular field of view of the tractor rear camera 215, a region of the trailer right view image that corresponds to the angular range φR is likewise determined in accordance with the hitch angle θ, and a region obtained by combining the regions determined for every angle of elevation or depression is set as the extraction region defining the image part to be extracted from the trailer right view image.

A region of the trailer left view image that corresponds to an angular range φL within the angular range Sφm is determined in accordance with the hitch angle θ. The angular range φL is a range, a rear view behind the tractor 2 within which range in the direction defined by the angle of elevation or depression γA appears as an image fully without being shielded by the trailer 1 in a version of the trailer left view image that is viewing-point-wise transformed to an image captured from the position of the tractor rear camera 215 in a case of viewing-point-wise transforming the trailer left view image using the set viewing point transform function.

Regarding the other angles of elevation or depression within the angular field of view of the tractor rear camera 215, a region of the trailer left view image that corresponds to the angular range φL is likewise determined in accordance with the hitch angle θ, and a region obtained by combining the regions determined for every angle of elevation or depression is set as the extraction region defining the image part to be extracted from the trailer left view image.

A region of the trailer rear view image that corresponds to an angular range φB within an angular range SφRL between the angular range ØR and the angular range φL is determined in accordance with the hitch angle θ. The angular range φB is a range, a rear view behind the tractor 2 within which range in the direction defined by the angle of elevation or depression YA appears as an image in a version of the trailer rear view image that is viewing-point-wise transformed to an image captured from the position of the tractor rear camera 215 in a case of viewing-point-wise transforming the trailer rear view image using the set viewing point transform function.

Regarding the other angles of elevation or depression within the angular field of view of the tractor rear camera 215, a region of the trailer rear view image that corresponds to the angular range φB is likewise determined in accordance with the hitch angle θ, and a region obtained by combining the regions determined for every angle of elevation or depression is set as the extraction region defining the image part to be extracted from the trailer rear view image.

Figure 5A:
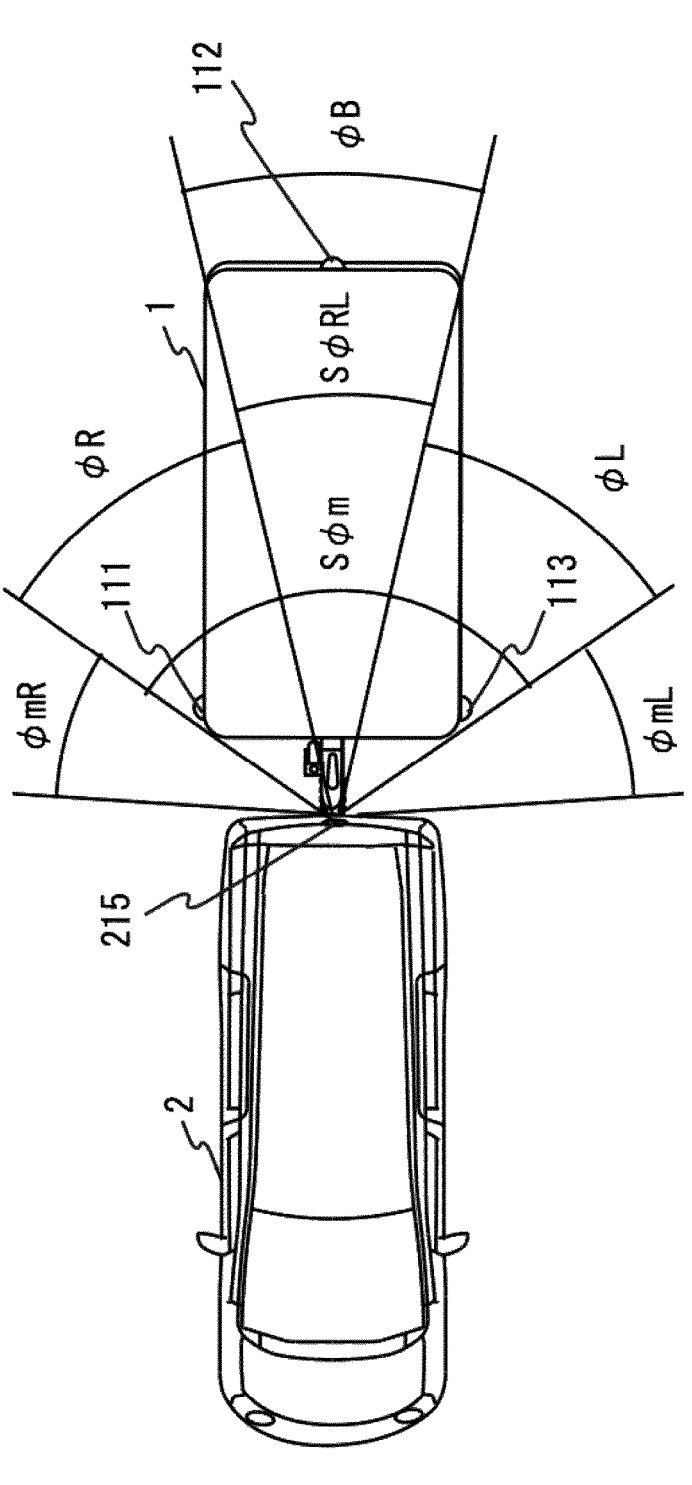
FIG. 5A is a view illustrating ranges in which images are used according to an embodiment of the present disclosure.
Figure 5B:
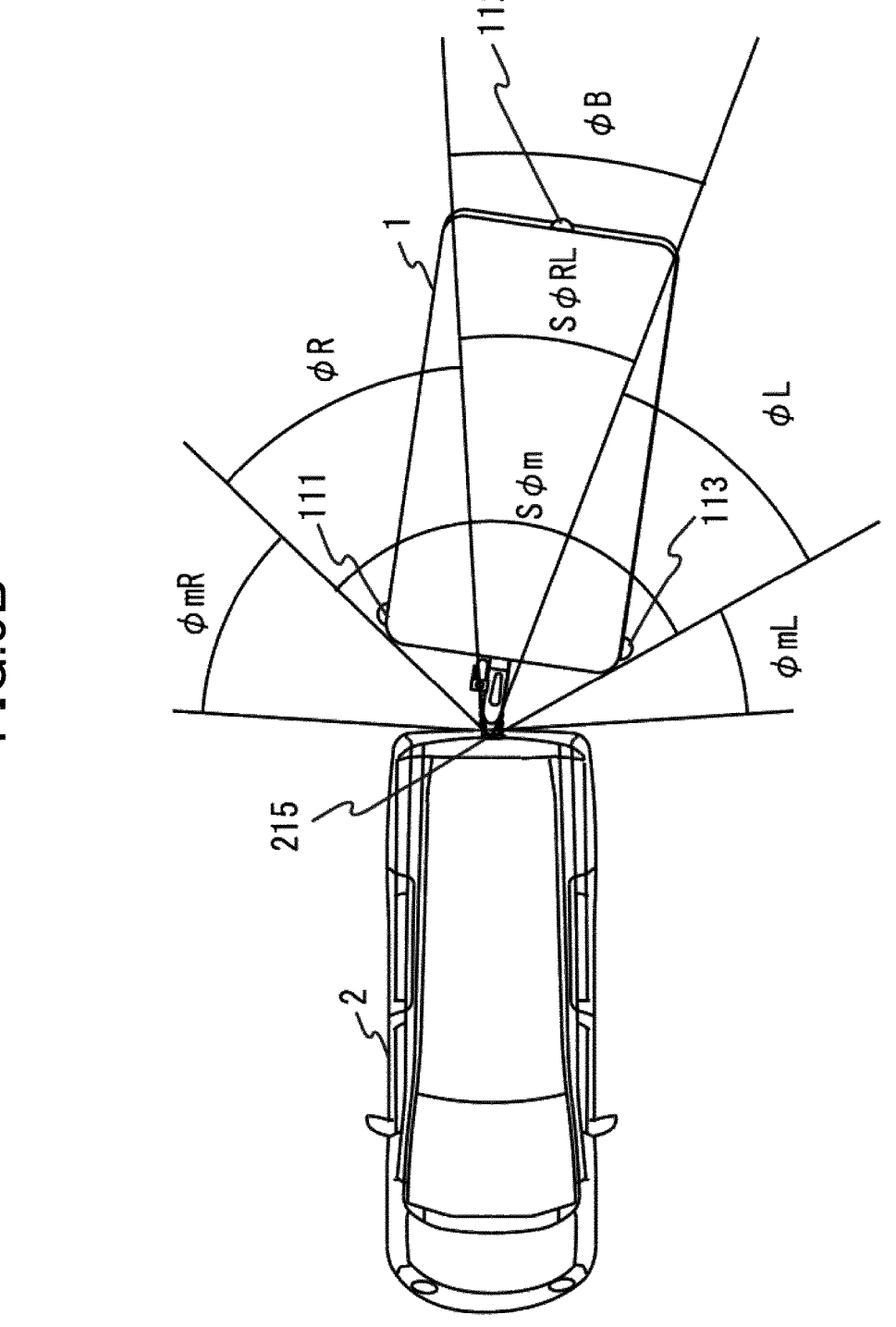
FIG. 5B is a view illustrating ranges in which images are used according to an embodiment of the present disclosure.

Here, the angular range φR, the angular range φL, and the angular range φB, for which images are extracted, are determined in accordance with the hitch angle θ, and change in accordance with the hitch angle θ as illustrated in FIG. 5A and FIG. 5B.

Moreover, the angular range φR, the angular range φL, and the angular range φB, for which images are extracted, are different per range of the angle of elevation or depression seen from the tractor rear camera 215. For example, in a left-right direction range at an angle of elevation or depression γB illustrated in FIG. 4, at which the tractor rear camera 215 captures an image of the space between the tractor 2 and the trailer 1, there exists no angular range Sφm, in which there is shielding against the tractor rear camera 215 by the trailer 1 (without taking shielding by the drawbar 12 into consideration). Moreover, no angular range PR, angular range φL, and angular range φB are set in a left-right direction range at an angle of elevation or depression γC, which defines a direction extending to exactly under the trailer 1 as seen from the tractor rear camera 215, because the trailer right camera 111, the trailer left camera 113, and the trailer rear camera 112 do not capture images in this left-right direction range.

To set the extraction regions, each image's extraction region corresponding to each hitch angle may be previously calculated and registered per hitch angle. In generating a rear view image, an extraction region registered in association with a hitch angle θ detected by the hitch angle sensor 216 may be used as the extraction region to be set.

Next, the image parts in the extraction regions of the trailer right view image, the trailer left view image, and the trailer rear view image, which are set in accordance with the hitch angle θ, are extracted from the extraction regions, and the extracted image parts are viewing-point-wise transformed to images captured from the position of the tractor rear camera 215 using the set viewing point transform functions.

Extraction and viewing point transformation of the image parts may be exchanged in order. The respective image parts may be extracted after the trailer right view image, the trailer left view image, and the trailer rear view image are viewing-point-wise transformed to images captured from the position of the tractor rear camera 215.

Then, a region of the tractor rear view image that corresponds to a trailer right view image part, which is the image obtained by viewing-point-wise transforming the image part extracted from the trailer right view image, is replaced with the trailer right view image part, a region of the tractor rear view image that corresponds to a trailer left view image part, which is the image obtained by viewing-point-wise transforming the image part extracted from the trailer left view image, is replaced with the trailer left view image part, and a region of the tractor rear view image that corresponds to a trailer rear view image part, which is the image obtained by viewing-point-wise transforming the image part extracted from the trailer rear view image, is replaced with the trailer rear view image part, to thereby generate a rear view image.

Figure 6A:
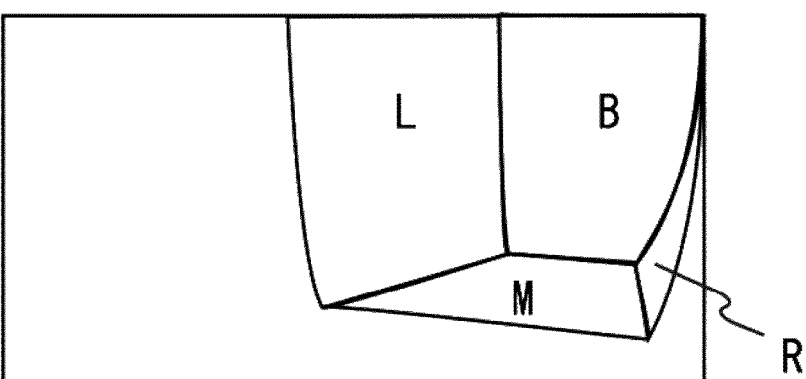
FIG. 6A is a view illustrating regions to which images are synthesized according to an embodiment of the present disclosure.
Figure 7A:
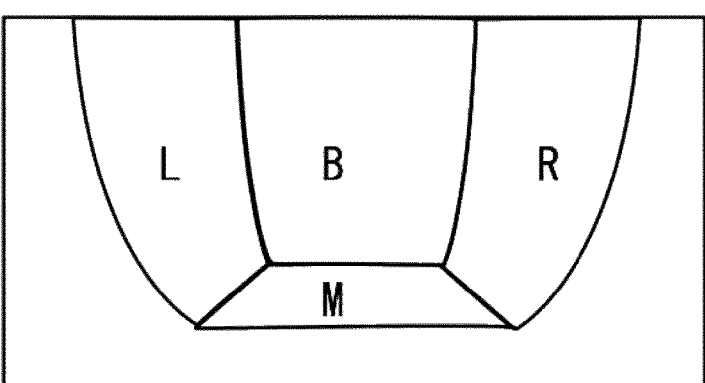
FIG. 7A is a view illustrating regions to which images are synthesized according to an embodiment of the present disclosure.
Figure 8A:
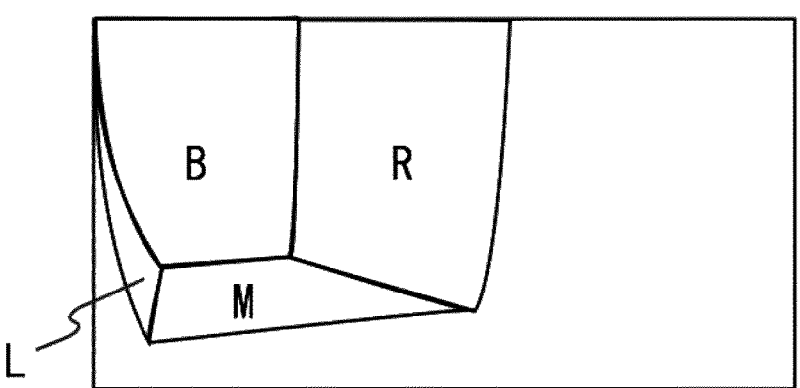
FIG. 8A is a view illustrating regions to which images are synthesized according to an embodiment of the present disclosure.

FIG. 6A, FIG. 7A, and FIG. 8A illustrate the regions of the tractor rear view image replaced with the trailer right view image part, the trailer left view image part, and the trailer rear view image part in the way described above. R denotes the region replaced with the trailer right view image part, L denotes the region replaced with the trailer left view image part, and B denotes the region replaced with the trailer rear view image part. M denotes a blind corner region, for which no image of a rear view behind the tractor 2 is captured by any of the cameras.

Figure 6B:
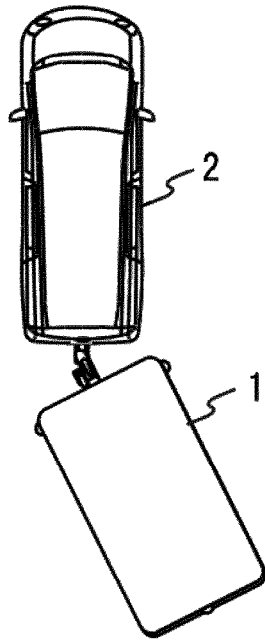
FIG. 6B is a view illustrating regions to which images are synthesized according to an embodiment of the present disclosure.
Figure 7B:
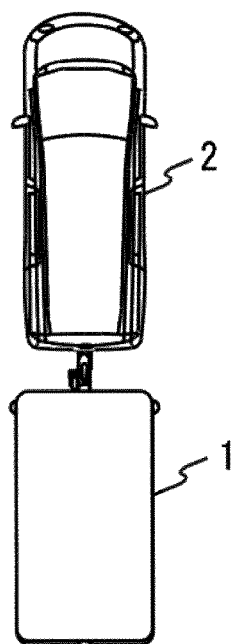
FIG. 7B is a view illustrating regions to which images are synthesized according to an embodiment of the present disclosure.
Figure 8B:
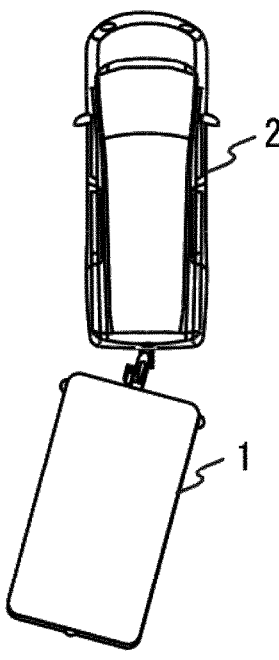
FIG. 8B is a view illustrating regions to which images are synthesized according to an embodiment of the present disclosure.

FIG. 6A illustrates the regions of the tractor rear view image replaced in a case where the hitch angle θ is as illustrated in FIG. 6B. FIG. 7A illustrates the regions of the tractor rear view image replaced in a case where the hitch angle θ is as illustrated in FIG. 7B. FIG. 8A illustrates the regions of the tractor rear view image replaced in a case where the hitch angle θ is as illustrated in FIG. 8B. As illustrated, these regions change in accordance with the hitch angle θ.

As illustrated in FIG. 4 to FIG. 8B, in a case where the shape of the trailer 1 is roughly a box shape (a rectangular parallelepiped shape), the trailer right view image part and the region R of the tractor rear view image replaced with the trailer right view image part are a part representing a range that is seen from the tractor rear camera 215 as existing approximately in a direction that is included in the right side surface of the trailer 1, the trailer left view image part and the region L of the tractor rear view image replaced with the trailer left view image part are a part representing a range that is seen from the tractor rear camera 215 as existing approximately in a direction that is included in the left side surface of the trailer 1, the trailer rear view image part and the region B of the tractor rear view image replaced with the trailer rear view image part are a part representing a range that is seen from the tractor rear camera 215 as existing approximately in a direction that is included in the rear surface of the trailer 1, and the blind corner region M is a part representing a range that is seen from the tractor rear camera 215 as existing approximately in a direction that is included in the bottom surface of the trailer 1.

Hence, by the region R, the region L, and the region B of the tractor rear view image being replaced with the trailer right view image part, the trailer left view image part, and the trailer rear view image part, respectively, an image of the rear view behind the tractor 2 that is roughly seen from the position of the tractor rear camera 215 through the respective portions of the trailer 1 except any portion that exists in a direction included in the bottom surface of the trailer 1 is generated as a rear view image.

FIG. 9 to FIG. 12 illustrate an example of a rear view image generated in the way described above.

Figure 9:
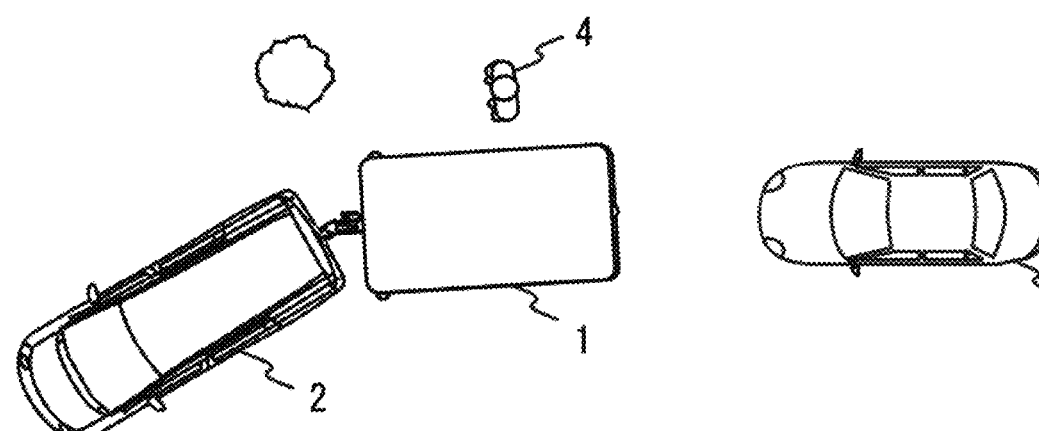
FIG. 9 is a view illustrating an example of a rear view image according to an embodiment of the present disclosure.
Figure 10:
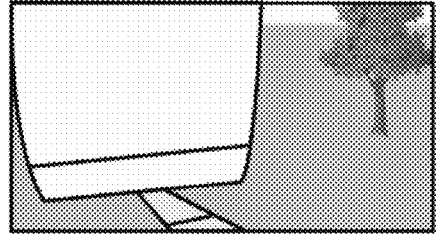
FIG. 10 is a view illustrating an example of a rear view image according to an embodiment of the present disclosure.
Figure 11C:
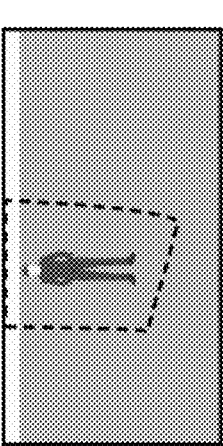
FIG. 11C is a view illustrating an example of a rear view image according to an embodiment of the present disclosure.
Figure 11B:
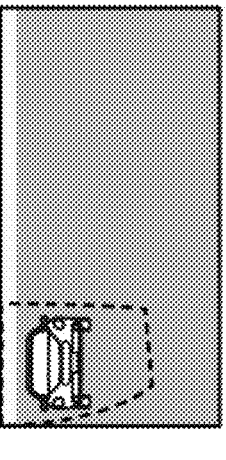
FIG. 11B is a view illustrating an example of a rear view image according to an embodiment of the present disclosure.
Figure 11A:
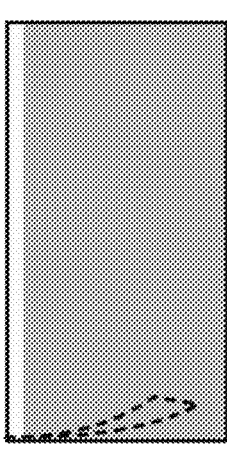
FIG. 11A is a view illustrating an example of a rear view image according to an embodiment of the present disclosure.

Here, it is assumed that in a situation in which another vehicle 3 exists behind the trailer 1, a person 4 exists on the right-hand side of the trailer 1, and the another vehicle 3 and the person 4 are shielded against the tractor rear camera 215 by the trailer 1 as illustrated in FIG. 9, a tractor rear view image is captured by the tractor rear camera 215 as illustrated in FIG. 10, a trailer left view image is captured by the trailer left camera 113 and viewing-point-wise transformed to an image illustrated in FIG. 11A, a trailer rear view image is captured by the trailer rear camera 112 and viewing-point-wise transformed to an image illustrated in FIG. 11B including the image of the another vehicle 3, and a trailer right view image is captured by the trailer right camera 111 and viewing-point-wise transformed to an image illustrated in FIG. 11C including the image of the person 4.

Figure 12:
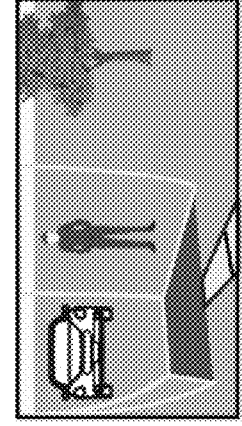
FIG. 12 is a view illustrating an example of a rear view image according to an embodiment of the present disclosure.

In this case, a rear view image is generated and displayed as illustrated in FIG. 12.

As illustrated, the rear view image is an image obtained by replacing the images of the regions of the tractor rear view image, the regions being shielded against the tractor rear camera 215 by the respective portions of the trailer 1 except the portion that exists in the direction included in the bottom surface of the trailer 1, with images appearing in the regions denoted by broken lines in the viewing-point-wise transformed version of the trailer left view image illustrated in FIG. 11A, the viewing-point-wise transformed version of the trailer rear view image illustrated in FIG. 11B, and the viewing-point-wise transformed version of the trailer right view image illustrated in FIG. 11C. The rear view image includes the images of the another vehicle 3 and the person 4 that cannot be captured by the tractor rear camera 215.

Hence, the rear view image represents with a less blind corner and seamlessly, a rear view in a wide range behind the tractor 2, while including the images of the another vehicle 3 and the person 4, which would generally be seen from the viewing point of the tractor rear camera 215 if the trailer 1 were transparent.

In this example, the blind corner region M, which is as illustrated in FIG. 6A, FIG. 7A, and FIG. 8A, for which no image of a rear view behind the tractor 2 is captured by any of the cameras, is solidly painted in a single color when the rear view image is generated, because the tractor rear view image, if displayed as is, would be discontinuous from the surrounding and unnatural. This solid painting may be performed using another pattern.

An embodiment of the present disclosure has been described above.

Here, in a case where the shape of the trailer 1 is roughly a box shape (a rectangular parallelepiped shape) as described above, the trailer right view image part and the region R of the tractor rear view image replaced with the trailer right view image part are a part representing a range that is seen from the tractor rear camera 215 as existing approximately in a direction that is included in the right side surface of the trailer 1, the trailer left view image part and the region L of the tractor rear view image replaced with the trailer left view image part are a part representing a range that is seen from the tractor rear camera 215 as existing approximately in a direction that is included in the left side surface of the trailer 1, and the trailer rear view image part and the region B of the tractor rear view image replaced with the trailer rear view image part are a part representing a range that is seen from the tractor rear camera 215 as existing approximately in a direction that is included in the rear surface of the trailer 1. Hence, in the embodiment described above in a case of being applied to a trailer 1 having roughly a box shape (a rectangular parallelepiped shape), a trailer right view image part, a trailer left view image part, and a trailer rear view image part may be generated as follows based on the hitch angle θ.

That is, a trailer right view image part may be a part obtained by extracting from a trailer right view image, a region of the trailer right view image that is supposed to represent a range of directions that are included in the right side surface of the trailer 1 through viewing point transformation, and then by viewing-point-wise transforming the extracted region, or may be a region representing a range of directions that are included in the right side surface of the trailer 1, the region being extracted from a viewing-point-wise transformed version of a trailer right view image. Likewise, a trailer left view image part may be a part obtained by extracting from a trailer left view image, a region of the trailer left view image that is supposed to represent a range of directions that are included in the left side surface of the trailer 1 through viewing point transformation, and then by viewing-point-wise transforming the extracted region, or may be a region representing a range of directions that are included in the left side surface of the trailer 1, the region being extracted from a viewing-point-wise transformed version of a trailer left view image. A trailer rear view image part may be a part obtained by extracting from a trailer rear view image, a region of the trailer rear view image that is supposed to represent a range of directions that are included in the rear surface of the trailer 1 through viewing point transformation, and then by viewing-point-wise transforming the extracted region, or may be a region representing a range of directions that are included in the rear surface of the trailer 1, the region being extracted from a viewing-point-wise transformed version of a trailer rear view image.

What is claimed is:

1. A rear view image display system configured to display a rear view image that is an image representing a rear view of a tractor configured to pull a trailer, the rear view image display system comprising:
    a tractor rear camera mounted on a rear portion of the tractor, the tractor rear camera configured to capture an image of a rear view from the rear portion of the tractor;
    a trailer rear camera mounted on a rear portion of the trailer, the trailer rear camera configured to capture an image of a rear view from the rear portion of the trailer;
    a trailer right camera mounted on a right side portion of the trailer, the trailer right camera configured to capture an image of a surrounding view of the trailer from the right side portion of the trailer;
    a trailer left camera mounted on a left side portion of the trailer, the trailer left camera configured to capture an image of a surrounding view of the trailer from the left side portion of the trailer;
    a hitch angle sensor configured to detect a hitch angle of the trailer; and
    a processor configured to generate the rear view image in accordance with a program readably stored in a memory,
    wherein the processor calculates, based on the hitch angle detected by the hitch angle sensor,
        a positional relationship between the tractor rear camera and each of the trailer rear camera, the trailer right camera, and the trailer left camera, and
    the processor sets, in accordance with the calculated positional relationship,
        a first viewing point transform function for transforming a trailer right view image to an image captured from a position of the tractor rear camera,
        a second viewing point transform function for transforming a trailer left view image to an image captured from the position of the tractor rear camera, and
        a third viewing point transform function for transforming a trailer rear view image to an image captured from the position of the tractor rear camera,
    wherein the processor calculates, based on the hitch angle detected by the hitch angle sensor,
        a shielded direction range that is a direction range seen from the tractor rear camera, the rear view in the shielded direction range being shielded against the tractor rear camera by the trailer,

12 a right replacement direction range in the shielded direction range, the right replacement direction range being a direction range seen from the tractor rear camera and fully unshielded against the trailer right camera by the trailer,
        a left replacement direction range in the shielded direction range, left replacement direction range being a direction range seen from the tractor rear camera and fully unshielded against the trailer left camera by the trailer, and
        a rear replacement direction range other than the right replacement direction range and the left replacement direction range in the shielded direction range, the rear replacement direction range being a direction range unshielded against the trailer rear camera by the trailer, and
    wherein the processor generates the rear view image by:
        replacing a part of a tractor rear view image captured by the tractor rear camera, the part corresponding to the right replacement direction range, with a part of the trailer right view image, corresponding to the right replacement direction range, extracted from an image obtained by transforming an image captured by the trailer right camera from a same viewing point as that of the tractor rear view image using the first viewing point transform function,
        replacing a part of the tractor rear view image corresponding to the left replacement direction range with a part of the trailer left view image, corresponding to the left replacement direction range, extracted from an image obtained by transforming an image captured by the trailer left camera from the same viewing point as that of the tractor rear view image using the second viewing point transform function,
        replacing a part of the tractor rear view image corresponding to the rear replacement direction range with a part of the trailer rear view image, corresponding to the rear replacement direction range, extracted from an image obtained by transforming an image captured by the trailer rear camera from the same viewing point as that of the tractor rear view image using the third viewing point transform function, and
        synthesizing the extracted part of the trailer right view image, the extracted part of the trailer left view image, and the extracted part of the trailer rear view image, with the tractor rear view image.

2. The rear view image display system according to claim 1,
    wherein the processor generates the rear view image by replacing a part of the tractor rear view image corresponding to a direction range that is other than the right replacement direction range, the left replacement direction range, and the rear replacement direction range in the shielded direction range with a predetermined pattern.

3. The rear view image display system according to claim 1,
    wherein the trailer right camera is mounted on a front end of the right side portion of the trailer, and the trailer left camera is mounted on a front end of the left side portion of the trailer.

4. The rear view image display system according to claim 1,
    wherein the processor
    determines the extracted part of the trailer right view image, the extracted part of the trailer left view image, and the extracted part of the trailer rear view image, based on the hitch angle of the trailer, and causes a synthesized image, in which the extracted parts of the trailer right view image, the trailer left view image, the trailer rear view image are combined, to move on a display of the rear view image display system, in accordance with the hitch angle of the trailer.

5. A rear view image display system configured to display a rear view image that is an image representing a rear view of a tractor configured to pull a trailer, the rear view image display system comprising:

a tractor rear camera mounted on a rear portion of the tractor, the tractor rear camera configured to capture an image of a rear view from the rear portion of the tractor;

a trailer rear camera mounted on a rear portion of the trailer, the trailer rear camera configured to capture an image of a rear view from the rear portion of the trailer;

a trailer right camera mounted on a right side portion of the trailer, the trailer right camera configured to capture an image of a surrounding view of the trailer from the right side portion of the trailer;

a trailer left camera mounted on a left side portion of the trailer, the trailer left camera configured to capture an image of a surrounding view of the trailer from the left side portion of the trailer;

a hitch angle sensor configured to detect a hitch angle of the trailer; and a processor configured to generate the rear view image in accordance with a program readably stored in a memory, wherein the processor calculates, based on the hitch angle detected by the hitch angle sensor, a positional relationship between the tractor rear camera and each of the trailer rear camera, the trailer right camera, and the trailer left camera, and the processor sets, in accordance with the calculated positional relationship, a first viewing point transform function for transforming a trailer right view image to an image captured from a position of the tractor rear camera, a second viewing point transform function for transforming a trailer left view image to an image captured from the position of the tractor rear camera, and a third viewing point transform function for transforming a trailer rear view image to an image captured from the position of the tractor rear camera, wherein the processor calculates, based on the hitch angle detected by the hitch angle sensor, a right replacement direction range that is a direction range seen from the tractor rear camera as being included in a right side surface of the trailer, a left replacement direction range that is a direction range seen from the tractor rear camera as being included in a left side surface of the trailer, and a rear replacement direction range that is a direction range seen from the tractor rear camera as being included in a rear surface of the trailer, and wherein the processor generates the rear view image by:

replacing a part of a tractor rear view image captured by the tractor rear camera, the part corresponding to the right replacement direction range, with a part of the trailer right view image, corresponding to the right replacement direction range, extracted from an image obtained by transforming an image captured by the trailer right camera from a same viewing point as that of the tractor rear view image using the first viewing point transform function, replacing a part of the tractor rear view image corresponding to the left replacement direction range with a part of the trailer left view image, corresponding to the left replacement direction range, extracted from an image obtained by transforming an image captured by the trailer left camera from the same viewing point as that of the tractor rear view image using the second viewing point transform function, replacing a part of the tractor rear view image corresponding to the rear replacement direction range with a part of the trailer rear view image, corresponding to the rear replacement direction range, extracted from an image obtained by transforming an image captured by the trailer rear camera from the same viewing point as that of the tractor rear view image using the third viewing point transform function, and synthesizing the extracted part of the trailer right view image, the extracted part of the trailer left view image, and the extracted part of the trailer rear view image, with the tractor rear view image.

6. The rear view image display system according to claim 5, wherein the processor calculates a masking direction range that is a direction range seen from the tractor rear camera as being included in a bottom surface of the trailer, based on the hitch angle detected by the hitch angle sensor, and the processor generates the rear view image by replacing a part of the tractor rear view image corresponding to the masking direction range with a predetermined pattern.

7. The rear view image display system according to claim 5, wherein the trailer right camera is mounted on a front end of the right side portion of the trailer, and the trailer left camera is mounted on a front end of the left side portion of the trailer.

8. The rear view image display system according to claim 5, wherein the processor determines the extracted part of the trailer right view image, the extracted part of the trailer left view image, and the extracted part of the trailer rear view image, based on the hitch angle of the trailer, and causes a synthesized image, in which the extracted parts of the trailer right view image, the trailer left view image, the trailer rear view image are combined, to move on a display of the rear view image display system, in accordance with the hitch angle of the trailer.

* * * * *